US012418125B2

(12) United States Patent
Takahira

(10) Patent No.: US 12,418,125 B2
(45) Date of Patent: Sep. 16, 2025

(54) IMPEDANCE MISMATCH SUPPRESSING CONNECTOR

(71) Applicant: YAMAICHI ELECTRONICS CO., LTD., Tokyo (JP)

(72) Inventor: Hiroshi Takahira, Tokyo (JP)

(73) Assignee: YAMAICHI ELECTRONICS CO., LTD., Tokyo (JP)

(*) Notice: Subject to any disclaimer, the term of this patent is extended or adjusted under 35 U.S.C. 154(b) by 381 days.

(21) Appl. No.: 18/042,407

(22) PCT Filed: Aug. 31, 2020

(86) PCT No.: PCT/JP2020/032910

§ 371 (c)(1),
(2) Date: Feb. 21, 2023

(87) PCT Pub. No.: WO2022/044333

PCT Pub. Date: Mar. 3, 2022

(65) Prior Publication Data

US 2023/0327356 A1 Oct. 12, 2023

(51) Int. Cl.

| | |
|---|---|
| ***H01R 12/91*** | (2011.01) |
| ***H01R 12/71*** | (2011.01) |
| ***H01R 13/405*** | (2006.01) |
| ***H01R 13/6473*** | (2011.01) |

(52) U.S. Cl.

CPC ........... *H01R 12/91* (2013.01); *H01R 12/716* (2013.01); *H01R 13/405* (2013.01); *H01R 13/6473* (2013.01)

(58) Field of Classification Search

CPC .... H01R 12/91; H01R 12/716; H01R 13/405; H01R 13/6473; H01R 12/73; H01R 13/6476; H01R 13/6477

See application file for complete search history.

(56) References Cited

U.S. PATENT DOCUMENTS

| | | | | |
|---|---|---|---|---|
| 9,281,594 | B2 * | 3/2016 | Funayama | H01R 13/20 |
| 9,300,064 | B2 * | 3/2016 | Takenaga | H01R 12/716 |
| 9,887,484 | B1 * | 2/2018 | Hu | H01R 24/60 |
| 2015/0044901 | A1 * | 2/2015 | Doi | H01R 12/716 439/592 |

(Continued)

FOREIGN PATENT DOCUMENTS

| | | | |
|---|---|---|---|
| CN | 1617396 | A | 5/2005 |
| CN | 101375471 | A | 2/2009 |

(Continued)

*Primary Examiner* — Abdullah A Riyami
*Assistant Examiner* — Nelson R. Burgos-Guntin
(74) *Attorney, Agent, or Firm* — Hayes Soloway P.C.

(57) ABSTRACT

Provided is a technical system by which the impedance mismatch of the plug unit of a connector can be suppressed. A plug unit of a connector includes: a plurality of contacts; and a housing having a base portion provided with a plurality of through holes into which the plurality of contacts are inserted, and a header that protrudes from the base portion and is provided with a plurality of slits holding portions of the plurality of contacts exposed toward the header side from the through holes. A portion of the contact inserted into the through hole and a portion of the contact held by the slit are formed in a linear shape.

8 Claims, 19 Drawing Sheets

(56) References Cited

U.S. PATENT DOCUMENTS

| | | | | |
|---|---|---|---|---|
| 2015/0044919 | A1* | 2/2015 | Kimura | H01R 12/85 439/862 |
| 2015/0132999 | A1* | 5/2015 | Sato | H01R 13/6315 439/676 |
| 2015/0270658 | A1* | 9/2015 | Aoki | H01R 24/60 439/660 |
| 2018/0019555 | A1 | 1/2018 | Shibuya | |
| 2018/0337482 | A1* | 11/2018 | Teruki | H01R 13/506 |
| 2019/0052005 | A1* | 2/2019 | Hasegawa | H01R 13/405 |
| 2020/0052424 | A1* | 2/2020 | Aoki | H01R 13/642 |

FOREIGN PATENT DOCUMENTS

| | | | |
|---|---|---|---|
| CN | 104347993 | A | 2/2015 |
| JP | 4-368787 | A | 12/1992 |
| JP | 3-236226 | A | 9/1996 |
| JP | 2005-32630 | A | 2/2005 |
| JP | 2013-45739 | A | 3/2013 |
| JP | 2019-175553 | A | 10/2019 |
| JP | 2019-160492 | A | 11/2019 |

* cited by examiner

IMPEDANCE MISMATCH SUPPRESSING CONNECTOR

CROSS-REFERENCE TO RELATED APPLICATIONS AND PRIORITY

This patent application claims priority from PCT Patent Application No. PCT/JP2020/032910 filed Aug. 31, 2020. This patent application is herein incorporated by reference in its entirety.

TECHNICAL FIELD

The present disclosure relates to a connector with a floating mechanism.

BACKGROUND

Among the connectors respectively mounted on the circuit board and the expansion board to mediate signal transmission between the boards, some have a floating mechanism that absorbs the error between the attachment position of the connector on the circuit board side and the attachment position of the connector on the expansion board side. As a document disclosing a technique related to this type of connector, Patent Document 1 can be taken up.

A connector for substrate connection of Patent Document 1 is composed of a socket-type first connector and a plug-type second connector fitted into the first connector. The first connector of this Document 1 includes a fixed housing, a floating housing, and a plurality of contacts bridged between these housings. The contact of the first connector has a first spring portion and a second spring portion extending in an inverted V-shape, and a curved inverted portion interposed between their upper ends, and a partition member made of an electrically insulating synthetic resin material is arranged between the inverted curved portions of adjacent contacts. According to the technique of Patent Document 1, due to the action of the partition member arranged between the inverted curved portions, the difference in impedance between the inverted curved portion and the other portion extending linearly is narrowed, and the impedance of the entire contact is homogenized. Thus, according to the Patent Document, the impedance mismatch can be suppressed

PRIOR ART REFERENCE

Patent Document

Patent Document 1: Japanese Patent Application Publication No. 2013-045739

SUMMARY

Problems to be Solved

However, the technique of Patent Document 1 has a mechanism that suppresses impedance mismatch on the socket type connector side, but it does not have such a mechanism on the plug type connector side. For this reason, the impedance mismatch on the plug type connector cannot be suppressed.

The present invention has been made in view of such a problem, and one of the objects is to provide a technical means capable of suppressing the impedance mismatch of the plug unit of a connector.

Means for Solving the Problem

In order to solve the above problem, a preferred aspect of the present disclosure is a connector including: a receptacle unit mounted on a first substrate and a plug unit mounted on a second substrate and connected to the receptacle unit, and electrically connecting the first substrate and the second substrate by connecting the receptacle unit and the plug unit, wherein the plug unit includes: a plurality of contacts; and a housing including a base portion provided with a plurality of through holes into which the a plurality of contacts are inserted, and a header protruding from the base portion and provided with a plurality of slits that hold portions of the a plurality of contacts exposed toward the header side from the through holes, and a portion of the contact inserted into the through hole and a portion of the contact held by the slit are formed in a linear shape.

In this aspect, two holding portions that hold a linear portion of the contact may be provided at an upper end and a lower end of the through hole in the base portion, and a gap may be formed between a peripheral wall of a portion between the two holding portions in the through hole and the linear portion.

Further, the contact has: a linear portion extending linearly along the through hole and the slit; and a terminal portion bent and extending outward from one end of the linear portion and connected to the substrate.

Further, the plurality of contacts may be in two columns of a left side column and a right side column.

Further, the through hole may have four peripheral walls opposed to each other in a left-right direction and a front-rear direction, and a groove may be provided at a portion of the peripheral wall excluding the two holding portions.

Further, the slit may have a peripheral wall connected to the peripheral wall of the through hole, and a groove may be provided in the peripheral wall of the slit.

Further, the groove of the through hole and the groove of the slit are recessed on the same side.

Further, the groove of the through hole and the groove of the slit have the same depth.

Effects

According to the present invention, a connector includes: a receptacle unit mounted on a first substrate and a plug unit that is mounted on a second substrate and connected to the receptacle unit, and the connector electrically connects the first substrate and the second substrate by connecting the receptacle unit and the plug unit, the plug unit includes: a plurality of contacts; and a housing including a base portion provided with a plurality of through holes into which the plurality of contacts are inserted, and a header protruding from the base portion and provided with a plurality of slits that hold portions of the a plurality of contacts exposed toward the header side from the through holes, and a portion of the contact inserted into the through hole and a portion of the contact held by the slit are formed in a linear shape. Thus, variations in impedance between the linear portion of the contact and the other bent portions are reduced. Therefore, it is possible to suppress impedance mismatch of the connector.

BRIEF DESCRIPTION OF DRAWINGS

FIG. 8B is a cross-sectional view taken along line A-A of FIG. 8A;

DETAILED DESCRIPTION

Figure 1A:
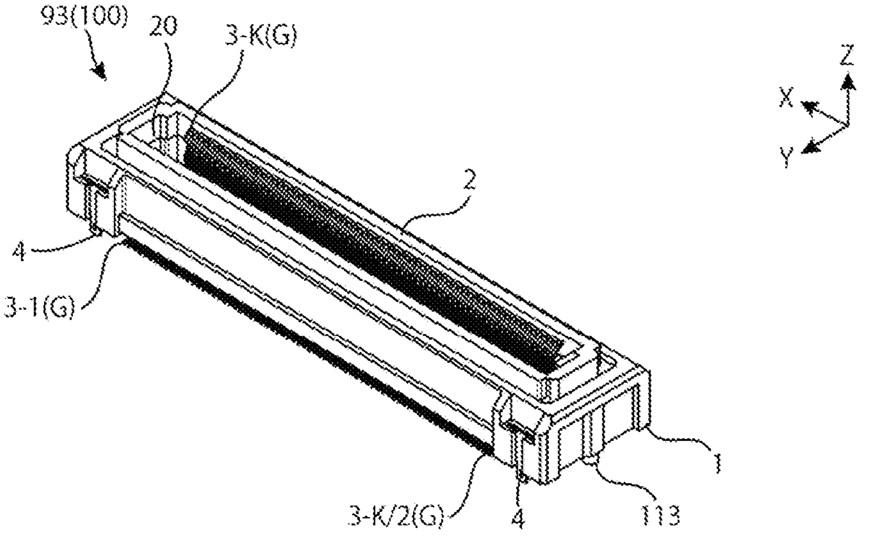
FIG. 1A is a perspective view of a receptacle unit 93 of a connector 100 according to one embodiment of the present disclosure.
Figure 1B:
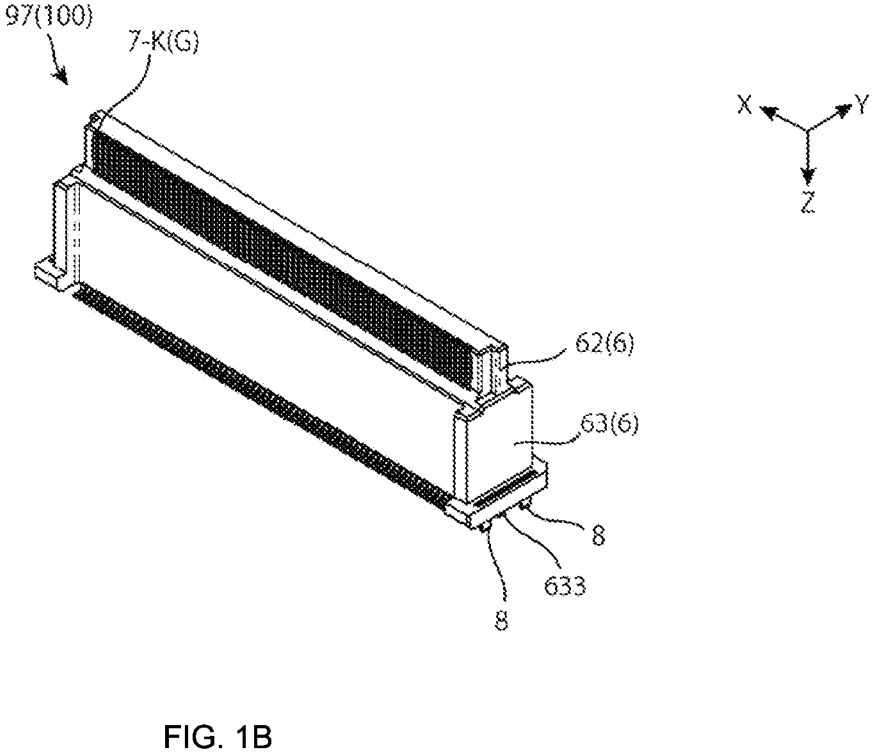
FIG. 1B is a perspective view of a plug unit 97 of the connector 100.
Figure 2:
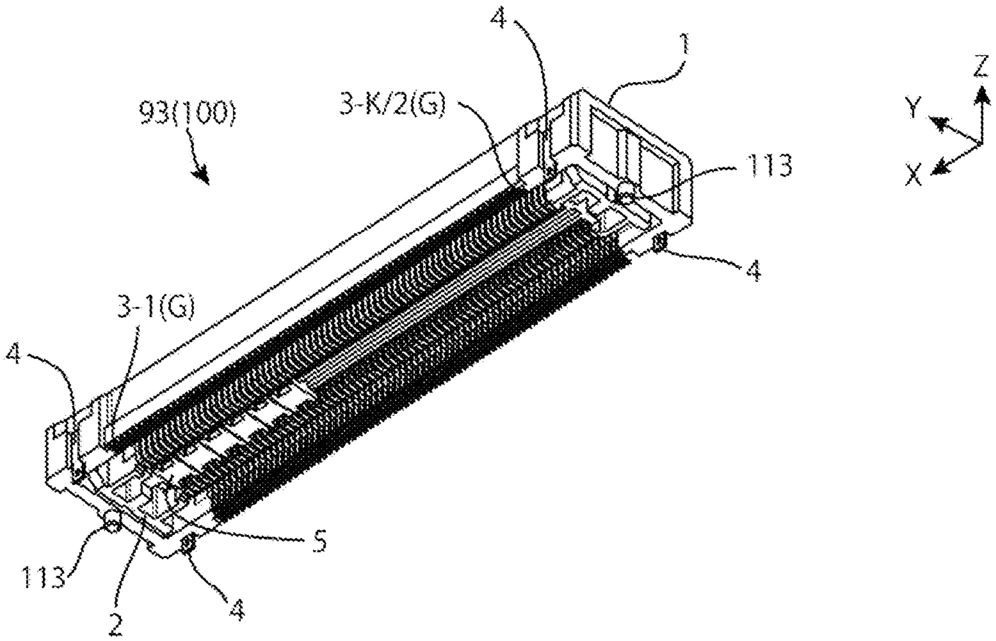
FIG. 2 is a perspective view of the receptacle unit 93 of FIG. 1A viewed from an opposite side.

Hereinafter, a connector 100 according to one embodiment of the present disclosure is explained with reference to drawings. The connector 100 includes a receptacle unit 93 and a plug unit 97. The receptacle unit 93 is mounted on an electronic substrate, which is a first substrate. The plug unit 97 is mounted on an expansion board, which is a second substrate. By fitting a header 62 of the plug unit 97 into a slot 20 of the receptacle unit 93 and connecting the receptacle unit 93 and the plug unit 97, K (K is 144, for example) contacts 7-*j* (j=1 to K) of the plug unit 97 and K contacts 3-*j* (j=1 to K) of the receptacle unit 93 are electrically connected, respectively, and high-speed differential transmission of maximum number of Gbps due to PAM (Pulse Amplitude Modulation) is made possible.

In the following description, a fitting direction of the plug unit 97 with respect to the receptacle unit 93 is appropriately referred to as a Z direction, one direction orthogonal to the Z direction is appropriately referred to as an X direction, and a direction orthogonal to both the Z direction and the Y direction is appropriately referred to as a Y direction. In addition, the +Z side may be referred to as an upper side, the −Z side may be referred to as a lower side, the +X side may be referred to as a front side, the −X side may be referred to as a rear side, the +Y side may be referred to as a left side, and the −Y side may be referred to as a right side. Further, among the contacts 3-*j* (j=1 to K) of the receptacle unit 93 and the contacts 7-*j* (j=1 to K) of the plug unit 97, letter (G) is attached to the contacts 3-*j* and contacts 7-*j* for ground of differential transmission, and letter (S) is attached to the contacts 3-*j* and contacts 7-*j* for signal to distinguish between them.

As shown in FIG. 1A, FIG. 2, FIG. 5A, FIG. 5B, FIG. 5C, and FIG. 5D, the receptacle unit 93 has a fixed housing 1, a floating housing 2, contacts 3-*j* (j=1 to K), an anchor plate 4, and a conductive resin member 5.

Figure 7A:
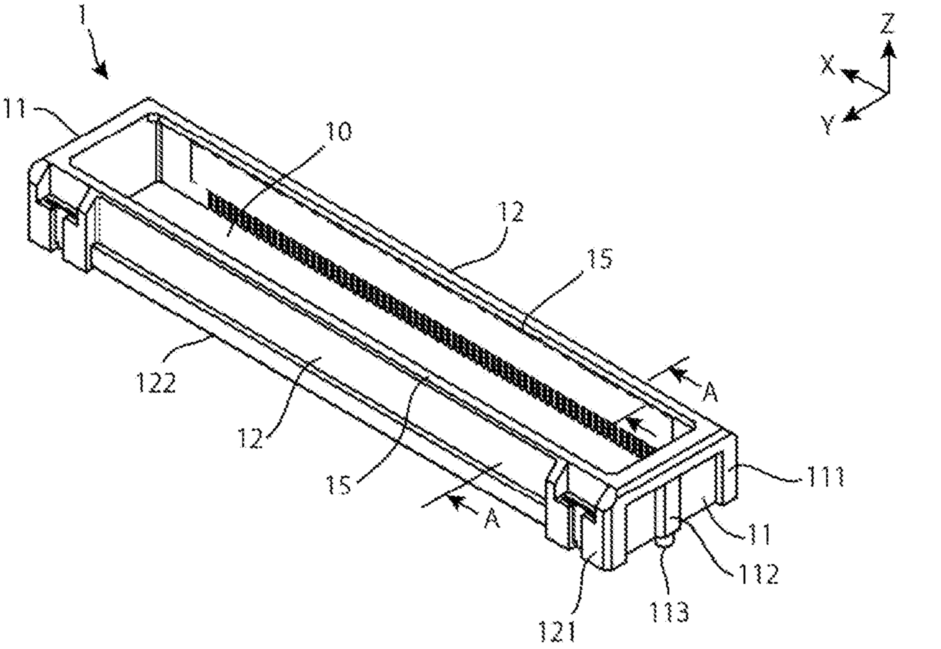
FIG. 7A is a perspective view of a fixed housing 1 of the receptacle unit 93.
Figure 7B:
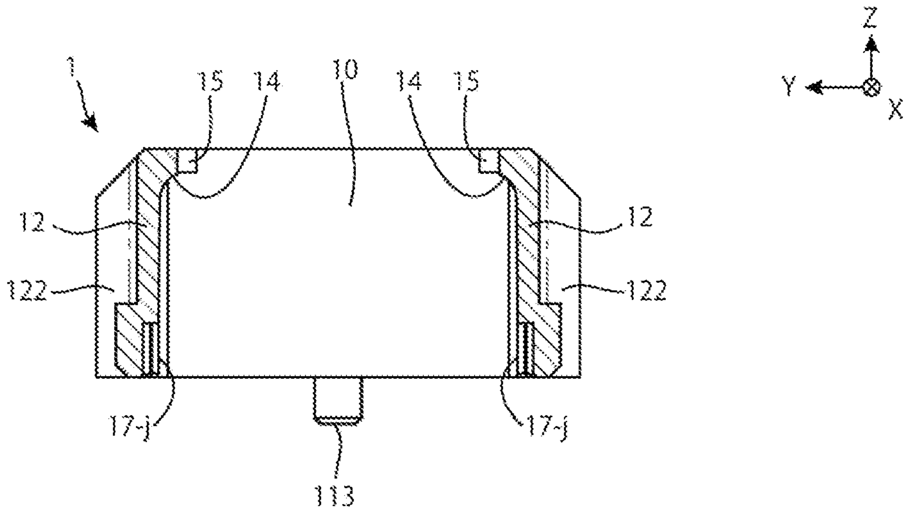
FIG. 7B is a cross-sectional view taken along line A-A of FIG. 7A.

As shown in FIG. 7, the fixed housing 1 has an opening portion 10 penetrating through the fixed housing 1 upward and downward, and wall portions 11 and 12, which are first wall portions surrounding the opening portion 10. The wall portions 11 are opposed to each other in the X direction with the opening portion 10 sandwiched therebetween, and the wall portions 12 are opposed to each other in the Y direction with the opening portion 10 sandwiched therebetween.

The upper and left and right edges of the outer surfaces of the front and rear wall portions 11 of the fixed housing 1 protrude outward as convex portions 111. In the middle of the outer surface of the wall portion 11, there is a middle plate 112 extending upward and downward. A positioning boss 113 is provided at the center of the lower surface of the wall portion 11. This positioning boss 113 is fitted into a positioning hole of an electronic substrate when fixing the receptacle unit 93 to the electronic substrate.

Holders 121 for mounting the anchor plate 4 are provided at end portions on the front side and rear side of the outer surface of the left and right wall portions 12 of the fixed housing 1. A lower end side between the two holders 121 on the outer surface of the wall portion 12 protrudes outward as a convex portion 122.

The lower sides of the inner surfaces of the left and right wall portions 12 of the fixed housing 1 are respectively provided with a column of K/2 slits 17-*j* arranged in the front and rear. On the upper sides of the inner surfaces of the wall portions 12 on the left and right, there are curved portions 14 curved inward in a quarter arc-shape, and there are inner edge portions 15 parallel to the inner surfaces on the curved portions 14.

Figure 8A:
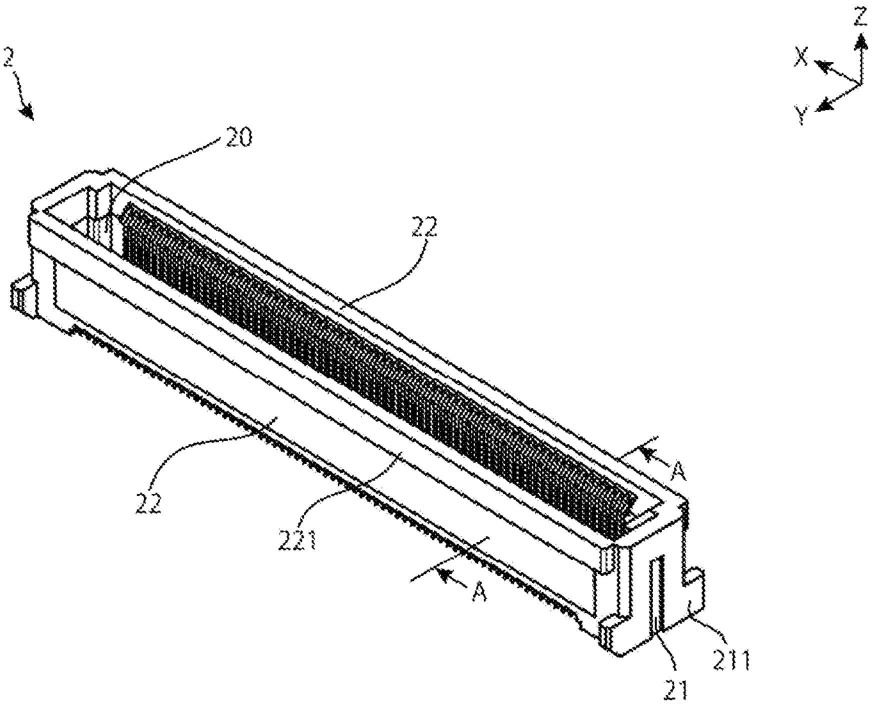
FIG. 8B is a perspective view of a floating housing 2 of the receptacle unit 93.
Figure 8B:
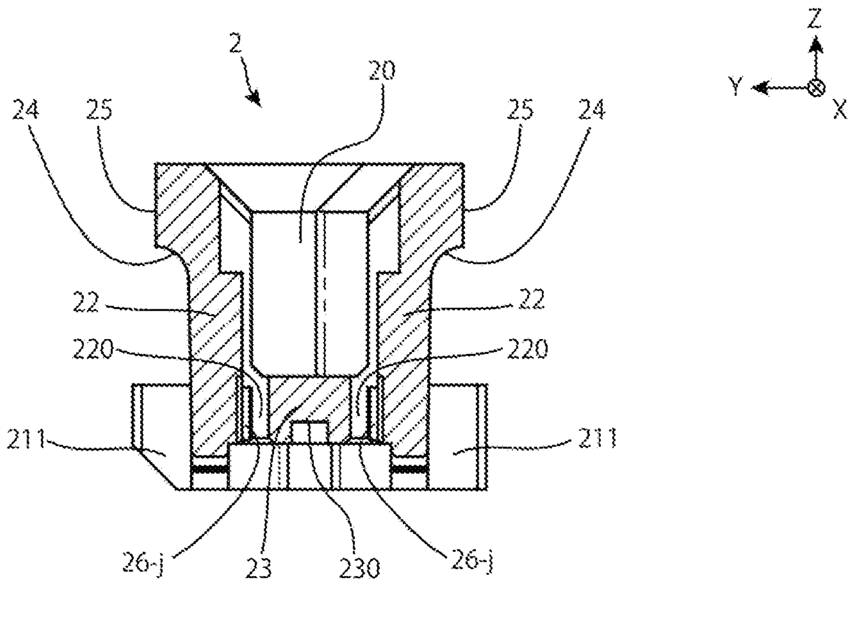

As shown in FIG. 8A and FIG. 8B, the floating housing 2 has a slot 20 into which the header 62 of the floating housing 2 is inserted, and wall portions 21 and 22, which are the second wall portions constituting the inner circumferential surface of the slot 20. The wall portions 21 are opposed to each other in the X direction with the slot 20 sandwiched therebetween, and the wall portions 22 are opposed to each other in the Y direction with the slot 20 sandwiched therebetween. The floating housing 2 has dimensions to be accommodated in the opening portion 10 of the fixed housing 1.

The upper and left and right edges of the outer surfaces of the front and rear wall portions 21 of the floating housing 2 protrude outward as convex portions 211. The left and right lower ends of the convex portion 211 protrude outward.

The inner surfaces of the left and right wall portions 22 of the floating housing 2 are stepped surfaces in which the surface on the lower side protrudes with respect to the surface on the upper side. The lower sides of the inner surfaces of the left and right wall portions 22 of the floating housing 2 are respectively provided with a column of K/2 slits 26-*j* arranged in the front and rear. On the upper sides of the outer surfaces of the left and right wall portions 22, there are curved portions 24 curved outward in a quarter arc-shape, and there are outer edge portions 25 parallel to the outer surfaces on the curved portions 24.

Figure 5A:
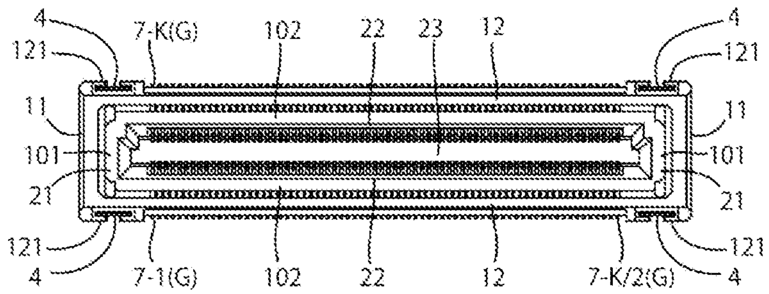
FIG. 5A is a view of the receptacle unit 93 viewed from a +Z side.
Figure 5B:
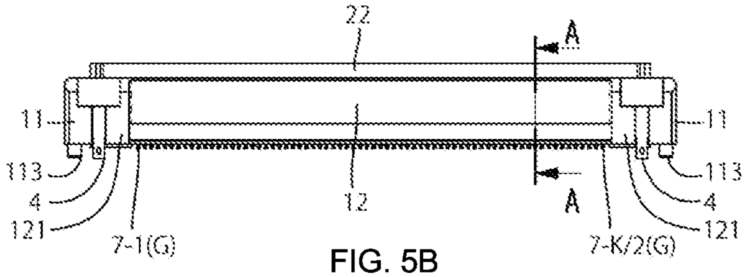
FIG. 5B is a view of the receptacle unit 93 viewed from a +Y side.
Figure 5D:
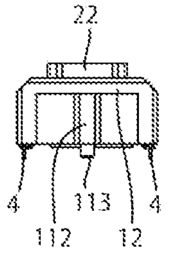
FIG. 5D is a view of the receptacle unit 93 viewed from an −X side.
Figure 5C:
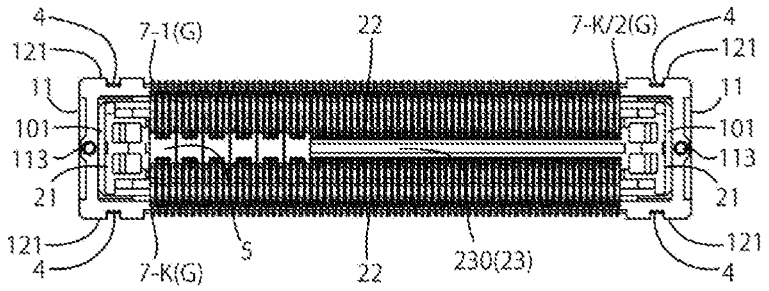
FIG. 5C is a view of the receptacle unit 93 viewed from a −Z side.

As shown in FIG. 5A, FIG. 5C, and FIG. 8B, a bottom portion 23 forming the bottom of the slot 20 is bridged between the lower end portions of the front and rear wall portions 21 in the floating housing 2. The bottom portion 23 extends in a straight line in the front and rear. As shown in FIG. 8B, there are through holes 220 between the bottom portion 23 and the inner surfaces of the wall portions 22 on both left and right side thereof. The through holes 220 penetrate through from the bottom surface toward the inside of the slot 20. The bottom surface of the floating housing 2 is provided with a conductive resin member 5. The bottom surface of the bottom portion 23 of the floating housing 2 is provided with a groove 230 for fixing the conductive resin member 5.

Figure 9:
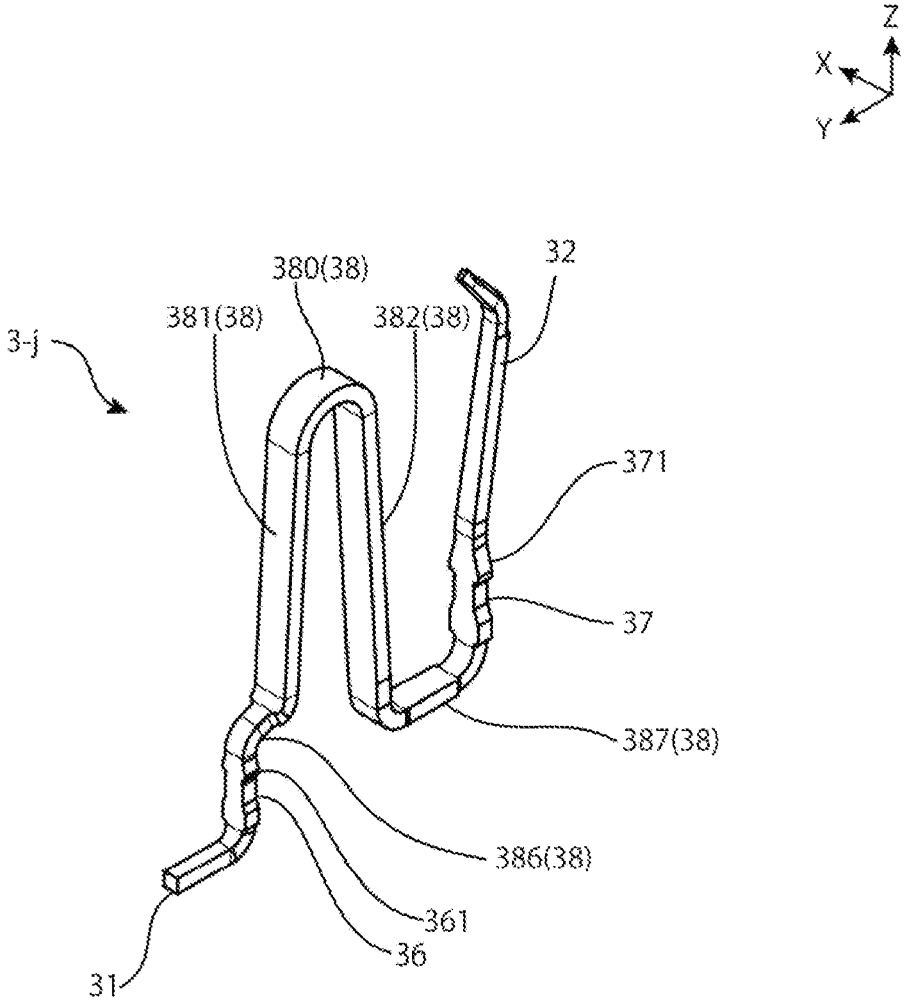
FIG. 9 is a perspective view of a contact 3-*j* of the receptacle unit 93.

The contacts 3-*j* (j=1 to K) form a column of K/2 contacts 3-*j* on the left and a column of K/2 contacts 3-*j* on the right. As shown in FIG. 9, the contact 3-*j* has a terminal portion 31 extending in a left-right direction on one end side, a contact point portion 32 extending in an up-down direction on the other end side, a support piece portion 36 connected to the terminal portion 31, a support piece portion 37 connected to the contact point portion 32, and an elastic deformation portion 38 interposed between these two support piece portions 36 and 37.

The tip end of the contact point portion 32 is bent into a doglegged shape. There are claw portions 361 and 371 protruding outward on the side surfaces of the support piece portion 36 and the support piece portion 37.

The elastic deformation portion 38 has a flexible portion 380 rounded in a semicircular shape, two linear portion 381 and linear portion 382 extending downward from both ends of the flexible portion 380, a connecting portion 386 bent toward the support piece portion 36 side at the lower end of the linear portion 381 and connected to the upper end of the support piece portion 36, and a connecting portion 387 bent toward the support piece portion 37 side at the lower end of the linear portion 382 and connected to the lower edge of the support piece portion 37. The elastic deformation portion 38 can be elastically deformed frontward, rearward, leftward, and rightward.

Figure 10:
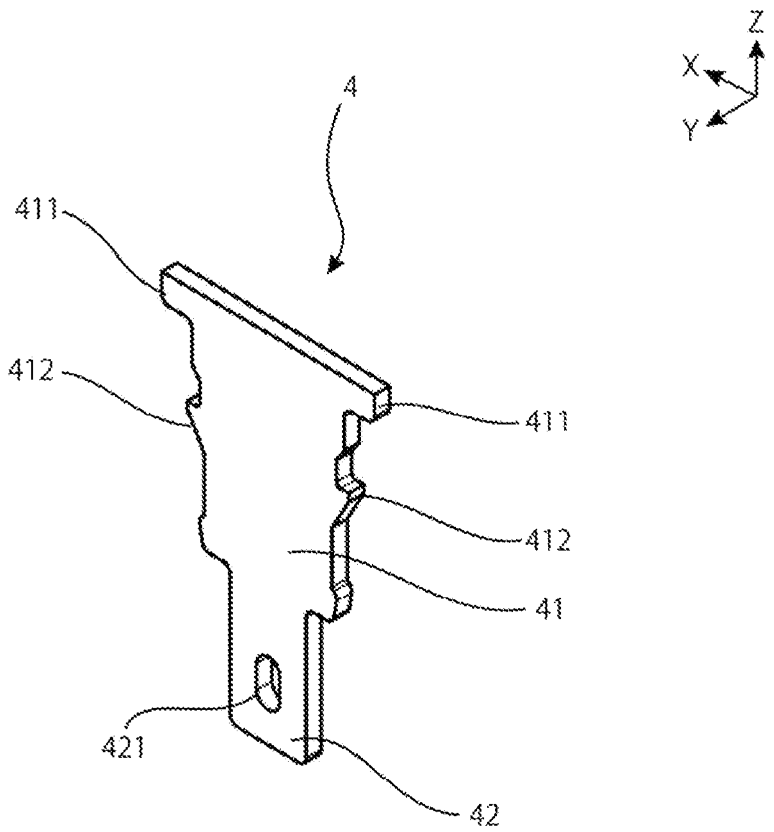
FIG. 10 is a perspective view of an anchor plate 4 of the receptacle unit 93.

As shown in FIG. 10, the anchor plate 4 has a main body portion 41, and a protruding portion 42 protruding downward from the lower edge of the main body portion 41. The upper edge of the side surface of main body portion 41 is provided with a convex portion 411 expanding laterally. There are claw portions 412 protruding outward below the convex portion 411 on the side surface of the main body portion 41. The protruding portion 42 is provided with a long hole 421.

Figure 11:
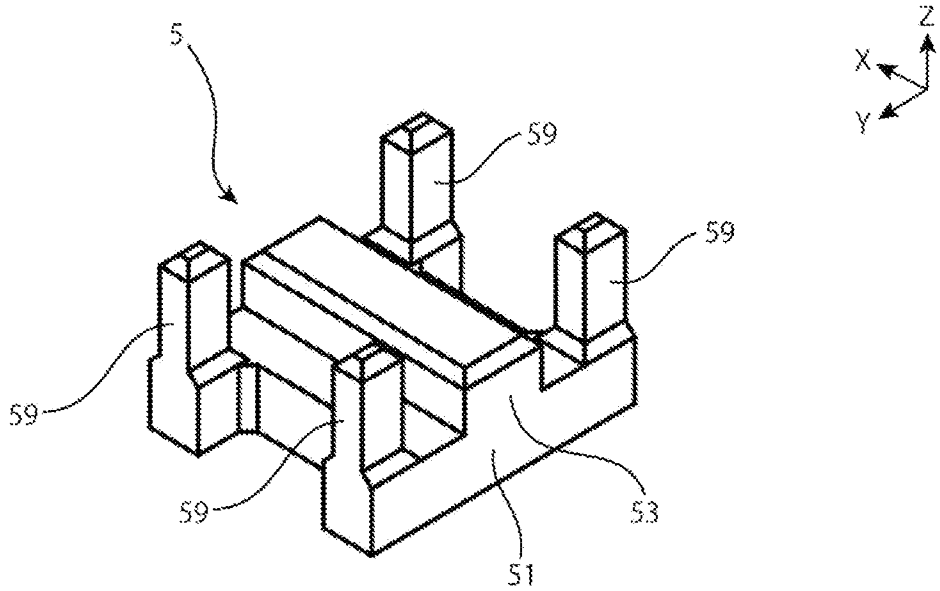
FIG. 11 is a perspective view of a conductive resin member 5 of the receptacle unit 93.
Figure 12A:
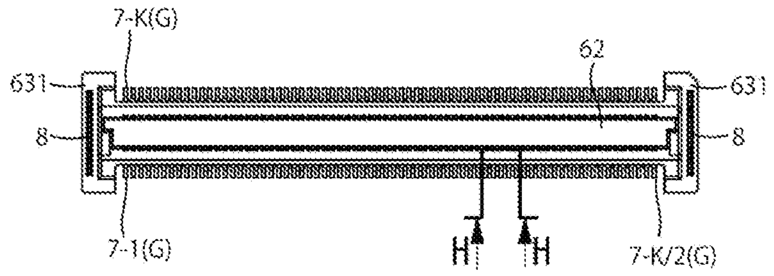
FIG. 12A is a view of the plug unit 97 viewed from the +Z side.
Figure 12B:
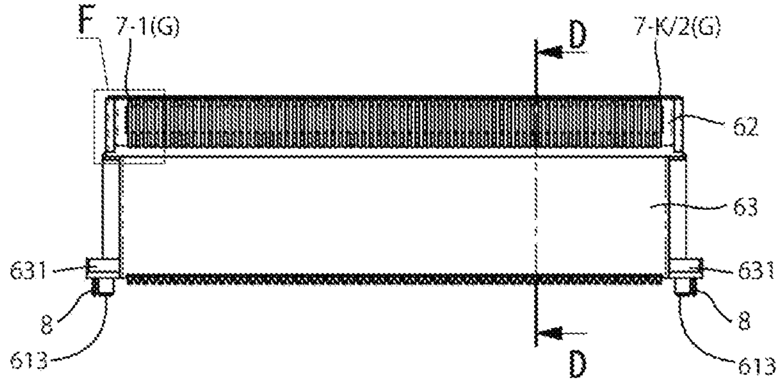
FIG. 12B is a view of the plug unit 97 viewed from the +Y side.
Figure 12D:
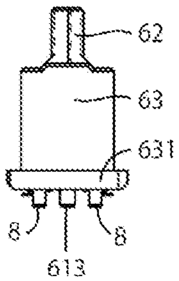
FIG. 12D is a view of the plug unit 97 viewed from the −X side.
Figure 12C:
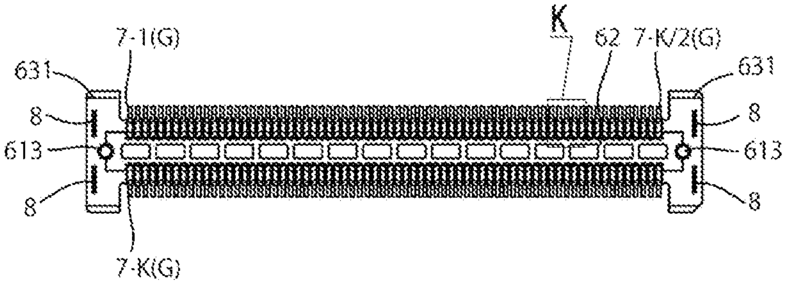
FIG. 12C is a view of the plug unit 97 viewed from the −Z side.
Figure 13A:
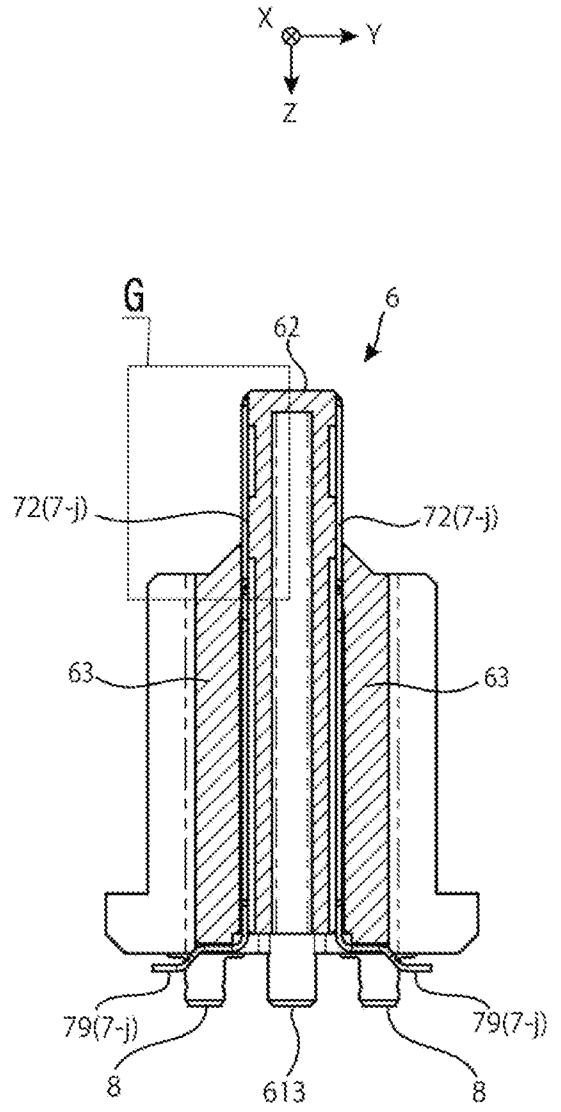
FIG. 13A is a cross-sectional view taken along line D-D of FIG. 12B.
Figure 13B:
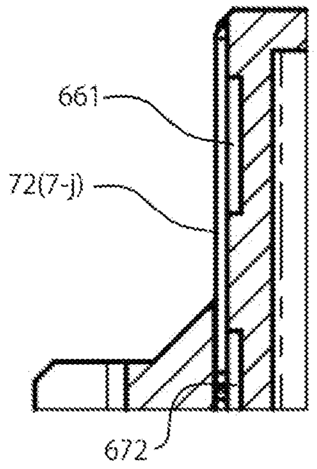
FIG. 13B is an enlarged view within the frame G of FIG. 13A.
Figure 14:
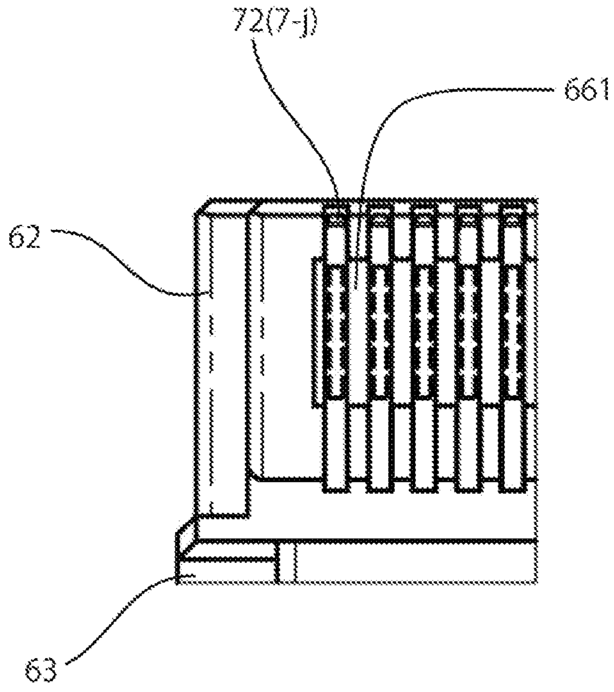
FIG. 14 is an enlarged view within the F frame of FIG. 12B.

As shown in FIG. 11, the conductive resin member 5 has a lower plate portion 51 in which four corners of a rectangular parallelepiped shape are protruded outward, a convex portion 53 protruding upward from the center of the upper surface of the lower plate portion 51, and pillar portions 59 erecting upward from tip ends of the lower plate portion 51 that are protruded outward. The left and right width of the projection 53 is substantially the same as the left and right width of the groove 230 of the bottom portion 23 of the floating housing 2.

The fixed housing 1, the floating housing 2, the contacts 3-*j* (j=1 to K), the anchor plate 4, and the conductive resin member 5 are combined as follows.

Figure 6:
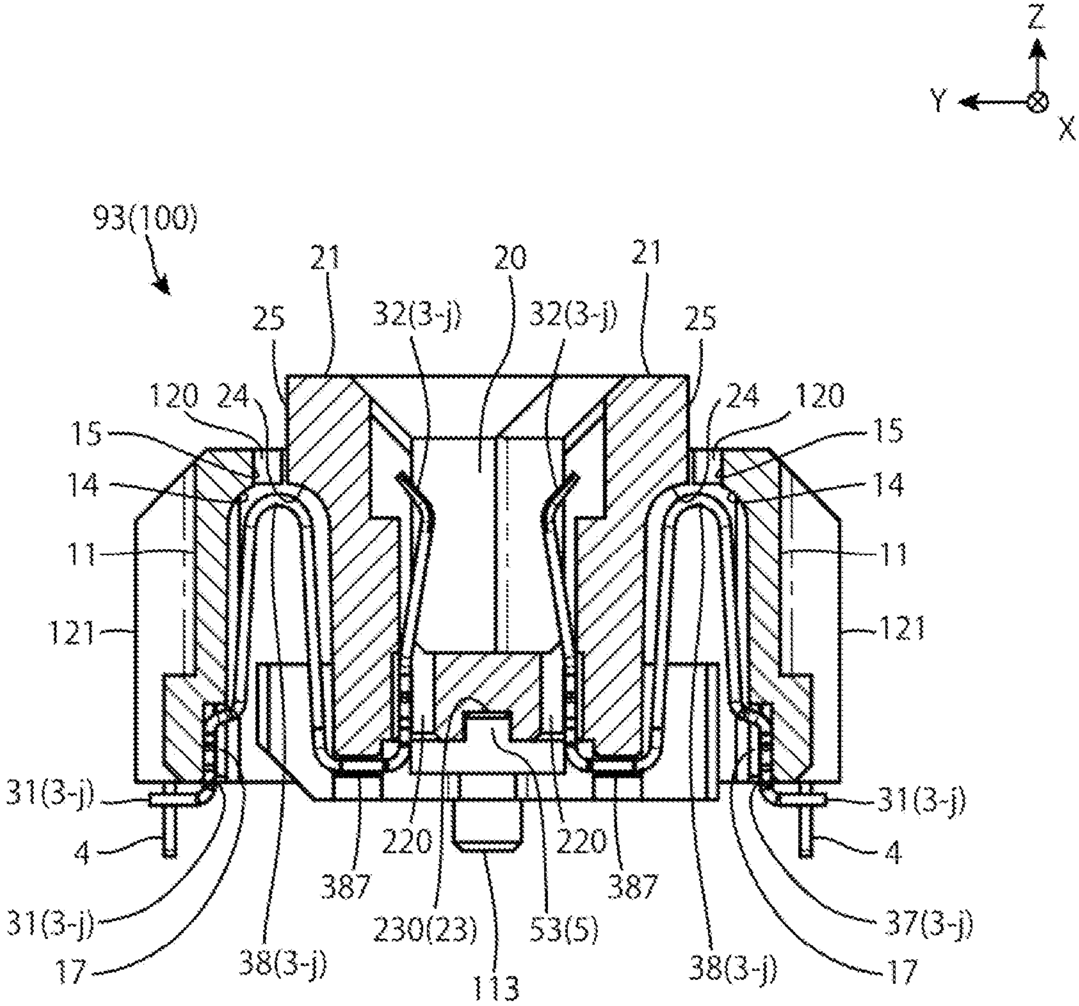
FIG. 6 is a cross-sectional view taken along line A-A of FIG. 5B.

As shown in FIG. 5A, FIG. 5C, and FIG. 6, the floating housing 2 is accommodated in the opening portion 10 of the fixed housing 1, two columns of contacts 3-*j* on the left and right are bridged between the floating housing 2 and the fixed housing 1, the conductive resin member 5 is mounted in the groove 230 of the bottom portion 23 of the floating housing 2, and the anchor plate 4 is mounted on the holder 121 of the fixed housing 1.

Here, in FIG. 5C, in order to show the groove 230, the number of the conductive resin members 5 is six, but in reality, the conductive resin members 5 are mounted on the entire lower surface of the bottom portion 23.

As shown in FIG. 5A, between the wall portion 11 of the fixed housing 1 and the wall portion 21 of the floating housing 2 in the opening portion 10, there is a movable space 101 for making the floating housing 2 float forward and rearward, and between the wall portion 12 of the fixed housing 1 and the wall portion 22 of the floating housing 2, there is a movable space 102 for making the floating housing 2 float leftward and rightward. The contacts 3-*j* (j=1 to K) are arranged in such an arrangement order that two contacts 3-*j* (G) and two contacts 3-*j* (S) are taken as one group, and the two contacts for signal are accommodated between the two contacts for ground.

As shown in FIG. 6, the contact 3-*j* is press-fitted into the fixed housing 1 and the floating housing 2 from the lower side such that the contact point portion 32 is protruded into the slot 20 via the through hole 220, and the elastic deformation portion 38 is accommodated in the movable space 102. The support piece portion 36 of the contact 3-*j* is accommodated and supported in the slit 17-*j*. The support piece portion 37 of the contact 3-*j* is accommodated and supported in the slit 26-*j*.

The connecting portion 387 of the contact 3-*j* is in contact with the lower surface of the floating housing 2. The terminal portion 31 of the contact 3-*j* is exposed to the lower side of the lower surface of the fixed housing 1. The terminal portion 31 of the contact 3-*j* is soldered and fixed to the pad of the electronic substrate. Between the adjacent contacts 3-*j*, there is no partition of the electric insulating member, and only an air layer exists.

As shown in FIG. 6, a gap 120 is provided between the inner edge portion 15 of the fixed housing 1 and the outer edge portion 25 of the floating housing 2. On the lower side of the gap 120 in the movable space 102, the curved portion 14 of the wall portion 12 and the curved portion 24 of the wall portion 22 are curved along the shape of the flexible portion 380 of the elastic deformation portion 38.

The convex portion 53 of the conductive resin member 5 is fitted in the groove 230 of the bottom portion 23 of the floating housing 2. The two pillar portions 59 on the left side of the conductive resin member 5 are in contact with the two contacts 3-*j* (G) on the left side. The two pillar portions 59 on the right side of the conductive resin member 5 are in contact with the two contacts 3-*j* (G) on the right side. The four contacts 3-*j* (G) are electrically connected via the conductive resin member 5. The protruding portion 42 of the anchor plate 4 mounted on the holder 121 extends to the lower side of the lower surface of the fixed housing 1.

As shown in FIG. 1B, FIG. 12A, FIG. 12B, FIG. 12C, and FIG. 12D, the plug unit 97 has a housing 6, contacts 7-*j* (j=1 to K), and an anchor plate 8.

Figure 17A:
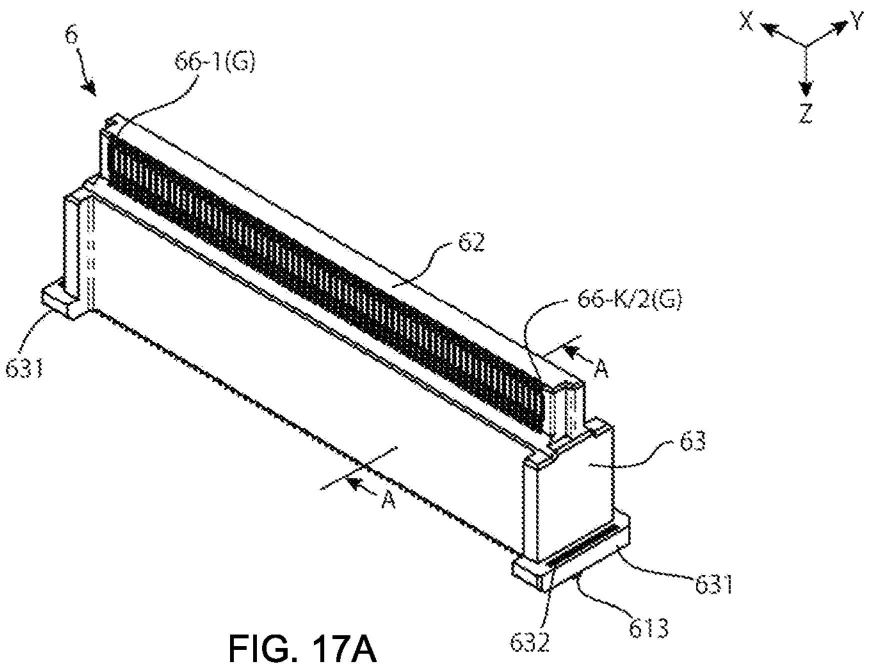
FIG. 17A is a perspective view of a housing 6 of the plug unit 97.
Figure 17B:
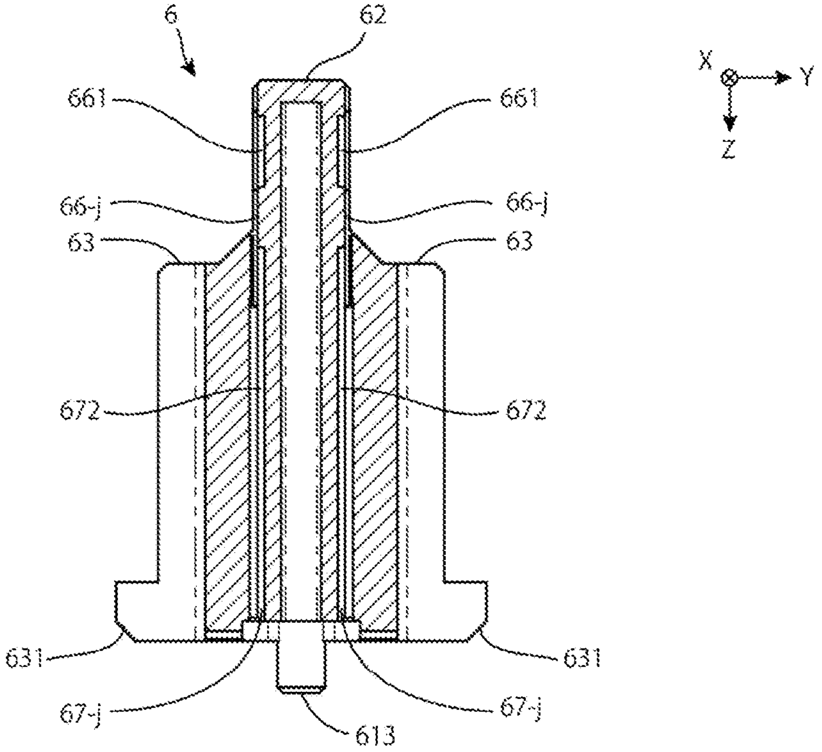
FIG. 17B is a cross-sectional view taken along line A-A of FIG. 17A.

As shown in FIG. 17A and FIG. 17B, the housing 6 has a header 62 and a base portion 63.

The header 62 protrudes downward from the lower surface of the base portion 63. The left and right outer surfaces of the header 62 are each provided with a column of K/2 slits 66-*j*.

The slit 66-*j* on the left side has a U-shaped cross section surrounded by the right peripheral wall, the front peripheral wall, and the rear peripheral wall. The right side of the slit 66-*j* on the left side is open, and the front peripheral wall and the rear peripheral wall are opposed to each other. The slit 66-*j* on the right side has a U-shaped cross section surrounded by the left peripheral wall, the front peripheral wall, and the rear peripheral wall. The left side of the slit 66-*j* on the right side is open, and the front peripheral wall and the rear peripheral wall are opposed to each other.

As shown in FIG. 17B, grooves 661 are provided in three peripheral walls of the slits 66-*j* on the left side and right side. The groove 661 of the front peripheral wall is recessed forward, the groove 661 of the rear peripheral wall is recessed rearward, the groove 661 of the left peripheral wall is recessed leftward, and the groove 661 of the right peripheral wall is recessed rightward.

A positioning boss 613 is provided at the center of the front and rear end portions of the upper surface of the base portion 63. The positioning boss 613 is fitted into the positioning hole of the expansion board when fixing the plug unit 97 to the expansion board. The upper edges of the front and rear side surfaces of the base portion 63 expand outward as outer edge portions 631. The outer edge portion 631 is provided with a holder 632 for mounting the anchor plate 8.

A column of K/2 through holes 67-*j* arranged in the front and rear is provided on each of the left side and right side of the center of the base portion 63 in the Y direction. The through hole 67-*j* penetrates through the base portion 63 upward and downward. The through hole 67-*j* on the left side is communicated with the slit 66-*j* on the left side, and the through hole 67-*j* on the right side is communicated with the slit 66-*j* on the right side.

The through holes 67-*j* on the left side and right side have a rectangular cross section surrounded by the left peripheral wall, the right peripheral wall, the front peripheral wall, and the rear peripheral wall. The left peripheral wall and the right peripheral wall are opposed to each other, and the front peripheral wall and the rear peripheral wall are opposed to each other, in the through holes 67-*j* on the left side and right side. The peripheral wall of the through hole 67-*j* is connected to the peripheral wall of the slit 66-*j*.

Figure 15A:
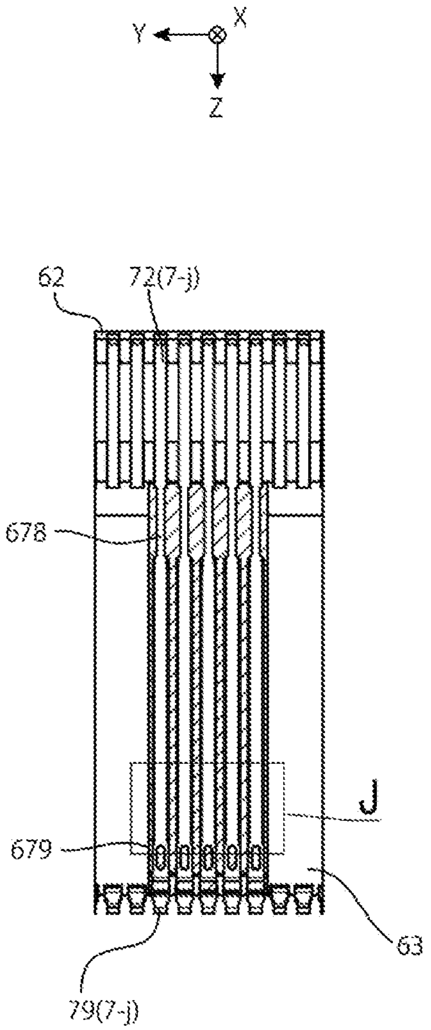
FIG. 15A is a cross-sectional view taken along line H-H of FIG. 12A.
Figure 15B:
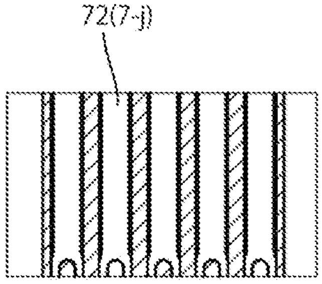
FIG. 15B is an enlarged view within the frame J of FIG. 15A.
Figure 16:
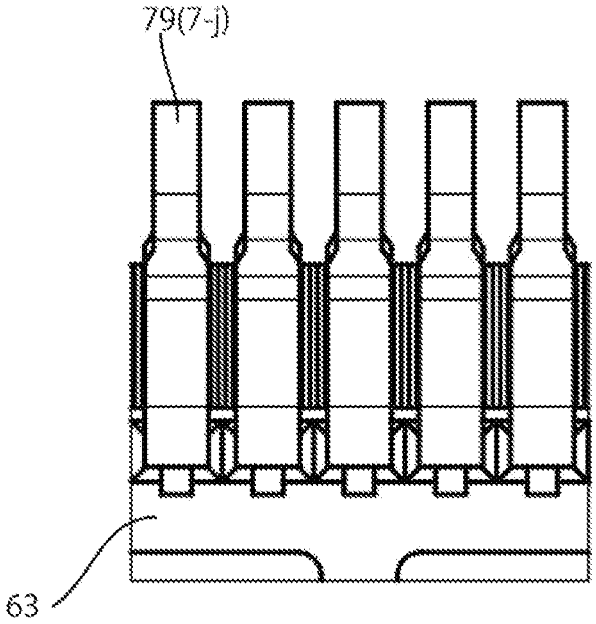
FIG. 16 is an enlarged view within the frame K of FIG. 12C.

As shown in FIG. 15A, two holding portions 679 and 678 constricted inward are provided at the upper end and lower end of the through holes 67-*j* on the left side and right side.

As shown in FIG. 17B, grooves 672 are provided in portions of the four peripheral walls of the left and right through holes 67-*j* excluding the two holding portions 679 and 678. The groove 672 of the front peripheral wall is recessed forward, the groove 672 of the rear peripheral wall is recessed rearward, the groove 672 of the left peripheral wall is recessed leftward, and the groove 672 of the right peripheral wall is recessed rightward. The orientation and depth of the groove 672 of the through hole 67-*j* are the same as the orientation and depth of the groove 661 of the slit 66-*j*.

Figure 18:
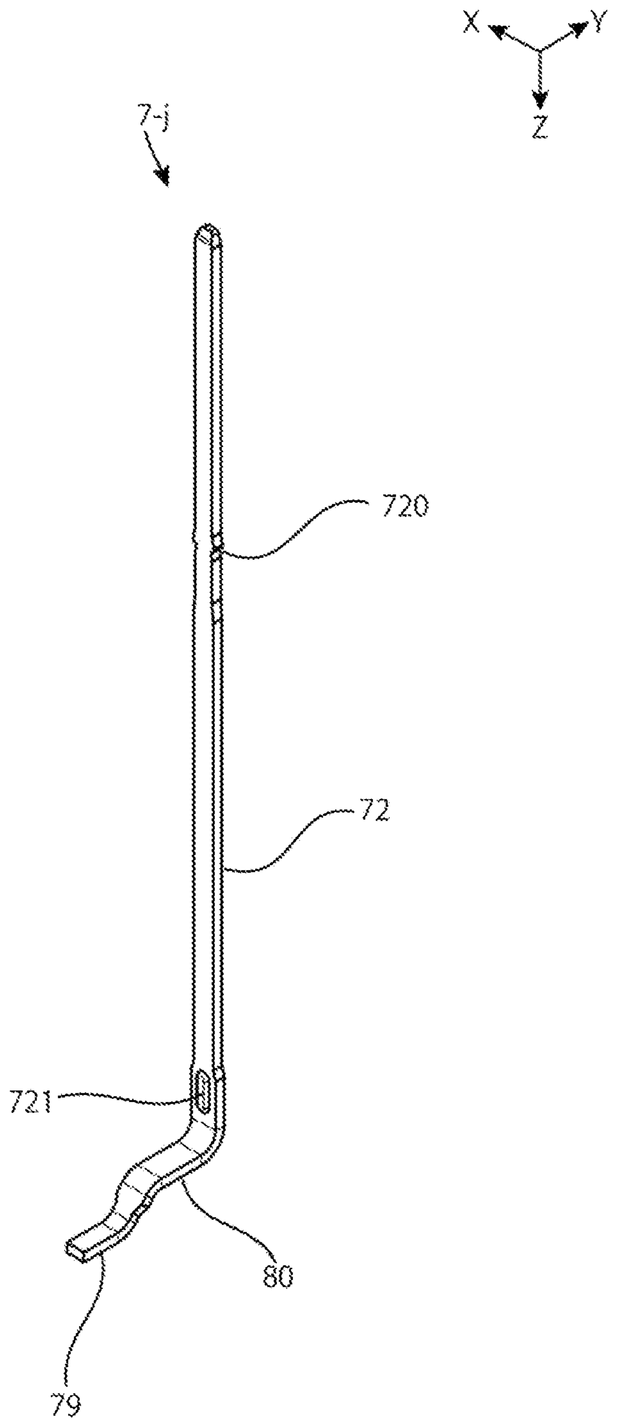
FIG. 18 is a perspective view of a contact 7-*j* of the plug unit 97.

The contacts 7-*j* (j=1 to K) form a column of K/2 contacts 7-*j* on the left and a column of K/2 contacts 7-*j* on the right. As shown in FIG. 18, the contact 7-*j* has a linear portion 72 extending in the up-down direction on one end side, a terminal portion 79 extending in the left-right direction on the other end side, and a connecting portion 80 interposed between the linear portion 72 and the terminal portion 79.

There is a claw portion 720 protruding outward at a position away from the lower end toward the upper side on the side surface of the linear portion 72. The upper end of the linear portion 72 is slightly wider than the portion below it. Further, this wider portion is provided with a long hole 721.

Figure 19:
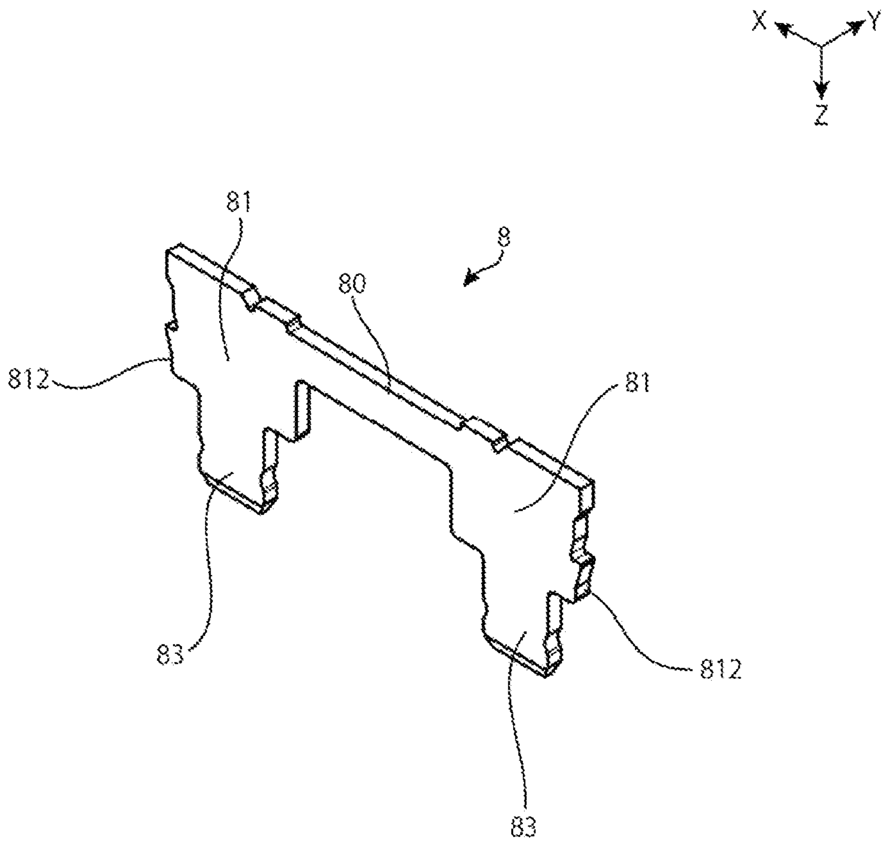
FIG. 19 is a perspective view of an anchor plate 8 of the plug unit 97.

As shown in FIG. 19, the anchor plate 8 has two rectangular piece portions 81, a bridged portion 40 bridged between the lower ends of the two rectangular piece portions 81, and protruding portions 83 protruding upward form the upper edges of the two rectangular piece portions 81. There are claw portions 812 protruding outward on the side surfaces of the two rectangular piece portions 81.

The housing 6, the contacts 7-*j* (j=1 to K), and the anchor plate 8 are combined as follows. The contacts 7-*j* (j=1 to K) are press-fitted into the housing 6 from the upper side. The linear portion 72 of the contact 7-*j* is inserted into the through hole 67-*j*, and its tip end side passes through the through hole 67-*j* and is held in the slit 66-*j*. The terminal portion 79 of the contact 7-*j* is exposed on the upper side of the upper surface of the housing 6. The terminal portion 79 of the contact 7-*j* is soldered and fixed to the pad of the expansion board.

The anchor plate 8 is mounted on the holder 632 of the housing 6. The protruding portion 83 of the anchor plate 8 extends to the upper side of the upper end of the housing 6. The linear portion 72 of the contact 7-*j* extends in a straight line along the through hole 67-*j* and the slit 66-*j*. The portion of the linear portion 72 where the claw portion 720 is located is supported by the holding portion 678 of the lower side, and the thicker upper end portion of the linear portion 72 is supported by the holding portion 679 of the upper side.

Figure 3:
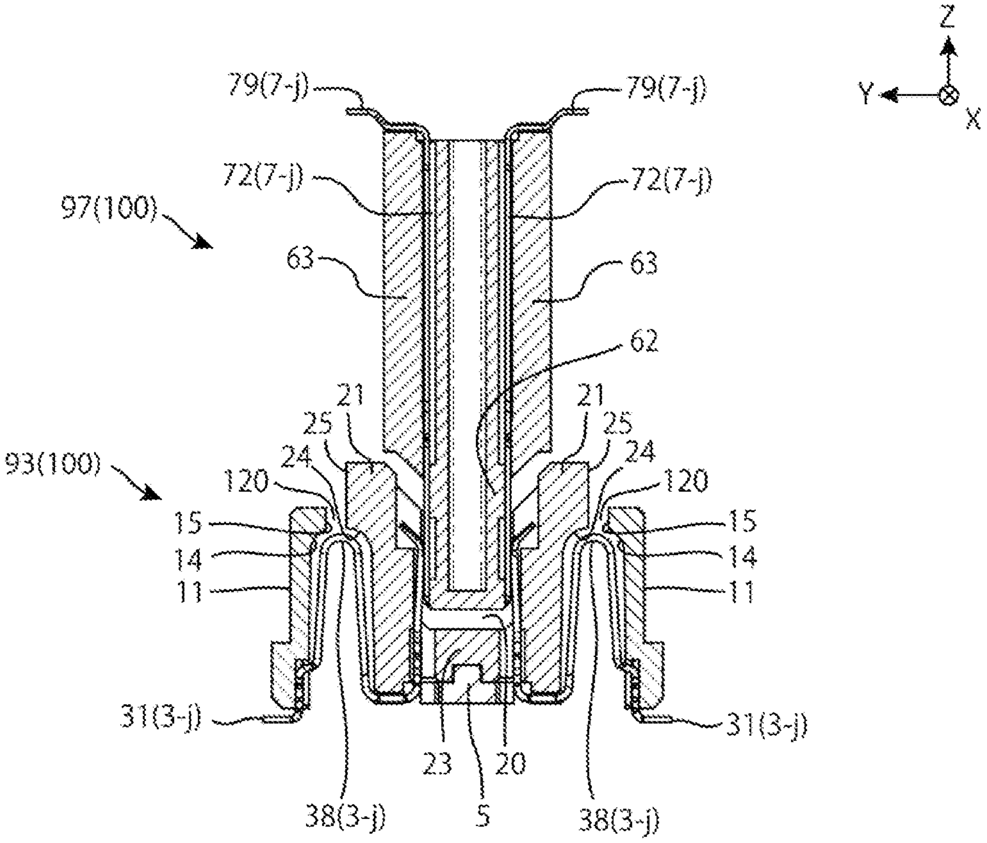
FIG. 3 is a cross-sectional view of the receptacle unit 93 and the plug unit 97 fitted together.

As shown in FIG. 3, when the header 62 of the plug unit 97 and the slot 20 of the receptacle unit 93 are fitted together, the linear portion 72 of the contact 7-*j* of the plug unit 97 and the contact point portion 32 of the contact 3-*j* of the receptacle unit 93 come into contact with each other.

Figure 4A:
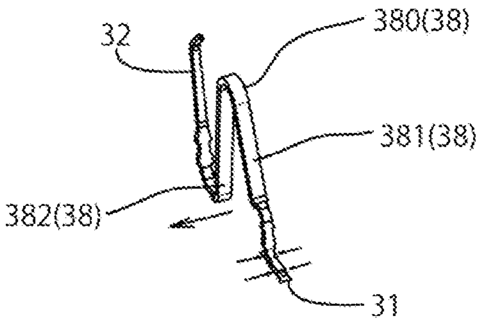
FIGS. 4A and 4B are diagrams showing how the receptacle unit 93 floats in an X direction, and FIG. 4 (C) is a diagram showing how the receptacle unit 93 floats in a Y direction.
Figure 4B:
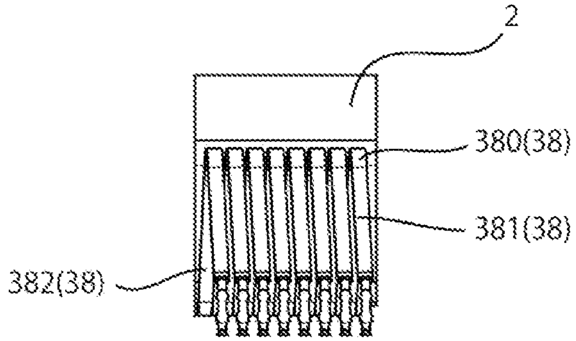

As shown in FIG. 4A and FIG. 4B, when the relative positions of the plug unit 97 and the receptacle unit 93 are displaced from each other in the front-rear direction, the contact 3-*j* is twisted so that the linear portion 381 and the linear portion 382 are tilted to the opposite sides, and the receptacle unit 93 moves forward or backward in the opening portion 10. Thereby, the positional displacement in the front-rear direction is eliminated.

Figure 4C:
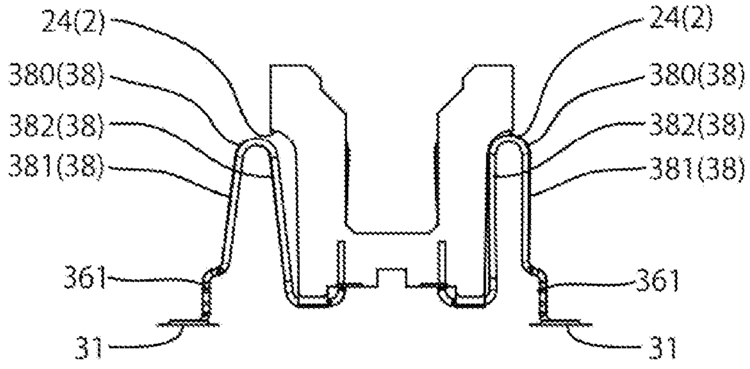

Further, as shown in FIG. 4C, when the relative positions of the plug unit 97 and the receptacle unit 93 are displaced from each other in the left-right direction, the left and right contacts 3-*j* are twisted so that one of the left and right linear portion 381 and linear portion 382 is widened and the other one of the linear portion 381 and linear portion 382 is narrowed, and the receptacle unit 93 moves leftward or rightward in the opening portion 10.

The details of the configuration of the present embodiment are described above. The plug unit 97 of the connector 100 according to the present embodiment includes: a plurality of contacts 7-*j* (j=1 to K); and a housing 6 having a base portion 63 provided with a plurality of through holes 67-*j* (j=1 to K) into which the plurality of contacts 7-*j* (j=1 to K) are inserted, and a header 62 protruding from the base portion 63 and provided with a plurality of slits 66-*j* (j=1 to K) that hold portions of the plurality of contacts 7-*j* (j=1 to K) exposed toward the header 62 side from the through holes 67-*j* (j=1 to K). A portion of the contact 7-*j* inserted into the through hole 67-*j* and a portion of the contact 7-*j* held by the slit 66-*j* are formed in a linear shape. Two holding portions 679 and 678 that hold a linear portion 72 of the contact 7-*j* are provided at an upper end and a lower end of the through hole 67-*j* in the base portion 63, and a gap is formed between a peripheral wall of a portion between the two holding portions 679 and 678 in the through hole 67-*j* and the linear portion 72 by a groove 672 between the peripheral wall and the linear portion 72. Thus, variations in impedance between the linear portion 72 of the contact 7-*j* and the other bent portions are reduced. Therefore, it is possible to suppress impedance mismatch of the plug unit 97.

Although the embodiment of the present disclosure has been described above, the following modifications may be added to this embodiment.

(1) In the embodiment described above, the column of the contacts 7-*j* (j=1 to K) of the plug unit 97 may be 1 column, or may be three columns or more.

(2) In the embodiment described above, the number of the anchor plates 8 is not necessary to be two, and may be one, or may be three or more.

(3) In the embodiment described above, grooves 672 are provided in portions of the four peripheral walls of the left and right through holes 67-*j* excluding the two holding portions 679 and 678. However, it is not necessary to provide the grooves 672 in all the four peripheral walls of the left and right through holes 67-*j*. For example, the grooves 672 may be provided only in the two left and right peripheral walls of the left and right through holes 67-*j*, or may be provided only in the two front and rear peripheral walls.

(4) In the embodiment described above, grooves 661 are provided in three peripheral walls of the left and right slits 66-*j*. However, it is not necessary to provide the slits 661 in all the three peripheral walls of the left and right through holes 66-*j*. For example, the grooves 661 may be provided only in the peripheral walls of the left and right slits 66-*j* on the side opposite to the open side.

(5) In the embodiment described above, the number K of the contacts 7-*j* may be 145 or more, or may be 143 or less.

What is claimed is:

1. A connector comprising a receptacle unit mounted on a first substrate and a plug unit that is mounted on a second substrate and is connected to the receptacle unit, wherein, the receptable unit comprises a plurality of first contacts;

the plug unit comprises a plurality of second contacts;

the connector electrically connects the first substrate and the second substrate by connecting the receptacle unit and the plug unit via the plurality of first contacts and the plurality of second contacts; and the plug unit further comprises;

a housing comprising a base portion provided with a plurality of through holes into which the plurality of second contacts are inserted, and a header that protrudes from the base portion and is provided with a plurality of slits to hold portions of the second contacts, the portions being exposed toward the header side from the through holes, and wherein, a first portion of the second contact inserted into the through hole and a second portion of the second contact held by the slit are formed in a linear shape.

2. The connector according to claim 1, wherein two holding portions that hold a linear portion of the second contact are provided at an upper end and a lower end of the through hole in the base portion, and a gap is formed between the linear portion and a peripheral wall of a portion between the two holding portions in the through hole.

3. The connector according to claim 1, wherein the second contact comprises:

a linear portion extending linearly along the through hole and the slit;

and a terminal portion that is bent and extending outward from one end of the linear portion and is connected to the substrate.

4. The connector according to claim 3, wherein the plurality of second contacts are in two columns of a left side column and a right side column.

5. The connector according to claim 4, wherein the through hole comprises four peripheral walls opposed to each other in a left-right direction and a front-rear direction, and a groove is provided at a portion of the peripheral wall excluding the two holding portions.

6. The connector according to claim 5, wherein the slit comprises a peripheral wall connected to the peripheral wall of the through hole, and a groove is provided in the peripheral wall of the slit.

7. The connector according to claim 6, wherein the groove of the through hole and the groove of the slit are recessed on the same side.

8. The connector according to claim 7, wherein the groove of the through hole and the groove of the slit have the same depth.

* * * * *